United States Patent [19]
Kuhl et al.

[11] Patent Number: 5,951,701
[45] Date of Patent: Sep. 14, 1999

[54] DETECTION OF LOOP-BACK CONDITIONS ON FAULTY DIGITAL TRUNKS

[75] Inventors: Tim Kuhl, Kanata; Bruce Nolan, Ashton; Mark Kitowicz, Ottawa, all of Canada

[73] Assignee: Newbridge Networks Corporation, Kanata, Canada

[21] Appl. No.: 08/930,107

[22] PCT Filed: May 8, 1996

[86] PCT No.: PCT/CA96/00289

§ 371 Date: Feb. 20, 1998

§ 102(e) Date: Feb. 20, 1998

[87] PCT Pub. No.: WO96/36147

PCT Pub. Date: Nov. 14, 1996

[30] Foreign Application Priority Data

May 11, 1995 [GB] United Kingdom .................... 9509554

[51] Int. Cl.[6] ...................................................... G06F 11/00
[52] U.S. Cl. ............................................ 714/717; 714/712
[58] Field of Search .................................. 371/20.5, 20.1, 371/37.01, 20.4, 41, 68.2; 395/183.19, 185.04, 182.02; 370/249, 241; 379/23, 5, 50; 714/18, 21, 25, 37, 43, 704, 712, 713, 717, 752

[56] References Cited

U.S. PATENT DOCUMENTS

| | | | |
|---|---|---|---|
| 5,166,923 | 11/1992 | Ohmori et al. | 370/15 |
| 5,473,665 | 12/1995 | Hall et al. | 379/29 |
| 5,477,529 | 12/1995 | Glingell | 370/13 |
| 5,506,956 | 4/1996 | Cohen | 395/182.04 |
| 5,732,124 | 3/1998 | Harris et al. | 379/23 |
| 5,778,003 | 7/1998 | Puppa et al. | 371/20.5 |

*Primary Examiner*—Ly V. Hua
*Assistant Examiner*—Nadeem Iqbal
*Attorney, Agent, or Firm*—Marks & Clerk

[57] ABSTRACT

A method of detecting loopbacks on trunks in digital networks, comprises the steps of detecting an out-of-service trunk, continually placing a predetermined bit pattern on an outgoing channel of a trunk card, continually monitoring a receive channel of the trunk card to detect said bit pattern, and identifying the presence of a loopback when said bit pattern is persistently detected on the receive channel. This method avoids the need to dedicate a trunk channel for signaling purposes. By detecting the presence of loopbacks, intelligent networks can be prevented from unjustifiably clearing an alarm condition and returning traffic to a fault path.

7 Claims, 2 Drawing Sheets 5,951,701

DETECTION OF LOOP-BACK CONDITIONS ON FAULTY DIGITAL TRUNKS

FIELD OF THE INVENTION

This invention relates to the detection of faults on digital trunks, such as T1 or E1 (DS1) trunks.

BACKGROUND OF THE INVENTION

In digital networks there is an on-going need to perform maintenance and diagnostic operations. One technique employed for this purpose is known as loopback. The transmit pair on a T1 card, for example, is connected directly back to the receive wire pair. If data on the T1 trunk is becoming corrupted, placing loopbacks at various points in the network can help isolate the fault.

In order to manage the network, some means must be provided for detecting when loopback occurs. One possibility is to use out-of-band signaling to detect the presence of loopbacks. However, services provided by some Carriers require that all twenty-four channels T1 trunk on a T1 carry 64Kbps data. Loopback detection using out-of-band signaling only allows twenty-three T1 channels to carry 64Kps data. Loopback detection using out-of-band signaling only allows twenty-three T1 channels to carry 64Kps data since one channel must be reserved for the out-of-bank signaling.

U.S. Pat. No. 4,059,729 discloses an arrangement for testing a communications channel by designating a subscriber channel with a control signal using a monitored data signal having the same data content as the multiplexed data stream.

An object of the invention is to remove this restriction.

A method of detecting loopbacks on trunks in digital networks, comprising the steps of detecting an out-of-service trunk; in response to the detection of an out-of-service trunk, initiating the continual placing of a predetermined bit pattern on at least one outgoing user channel on said out-of-service trunk at a network node while it remains out-of-service; continually monitoring at least one receive user channel on said trunk at said network node corresponding to said at least one outgoing channel to detect said bit pattern; and identifying the presence of a loopback when said bit pattern is persistently detected on said receive channel while said trunk is out of service.

The invention determines when a loopback has been placed on the trunk, which might be a T1, E1 or any other primary rate transmission medium that carries channelized information. This information is used by the equipment at the endpoints to determine if it is safe to switch back to the preferred trunk. If there are loopbacks, then the link status on the preferred path is not OK and the traffic remains on the alternate route.

Loopback detection occurs only when the link is out of service and none of the 24 channels are being used to carry user data.

The invention also provides an apparatus for detecting loopbacks on trunks in digital networks, comprising a detector for detecting an out-of-service trunk, means for initiating the continual placement of a predetermined bit pattern on an outgoing user channel in response to the detection of an out-of-service trunk at a network node by said detector while said trunk remains out of service, means for continually monitoring a receive user channel of said trunk at said network node to detect said bit pattern while said trunk is out of service, and means for identifying the presence of a loopback when said bit pattern is persistently detected on said receive user channel.

In one embodiment, a detector is provided to detect the out-of-service trunk.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
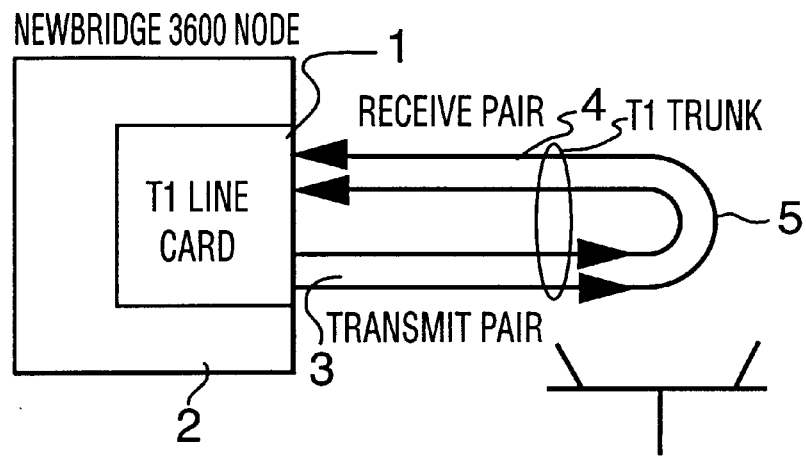
FIG. 1 shows a loopback present in an out-of-service T1 trunk.

Referring to FIG. 1, a T1 card 1 is mounted in the backplane of a Newbridge Networks Mainstreet™ 3600 multiplexer. The card 1 has a transmit pair 3 and receive pair 4 that are normally connected to the appropriate terminals of a similar card in a far-end multiplexer. As shown in FIG. 1, a loopback 5 is provided between the transmit pair 2 and the receive pair 4 for the purpose of isolating faults in the network.

In a conventional network, a T1 card is designed to enter an alarm state when it detects faults on the T1 trunk. The problem with placing a loopback on the trunk is that it can cause the alarm state to clear even though the fault is still present.

In an intelligent network, when a T1 failure occurs, the traffic that was carried on the failed T1 link, can be switched onto a back-up or an alternate T1 trunk. Once, the failure has been corrected, a switch-back to the preferred route occurs.

Figure 2:
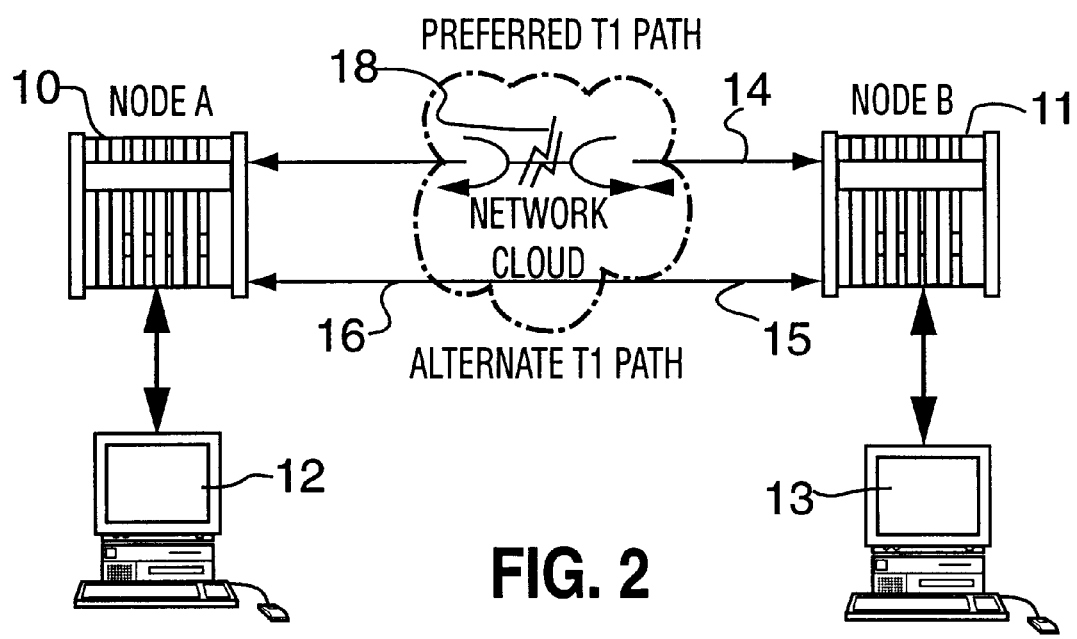
FIG. 2 shows a multi-hop network employing loopback detection in accordance with the invention.

An example of a network using preferred and alternate T1 trunks is shown in FIG. 2.

In FIG. 2, nodes A and B in a digital network comprise Mainstreetw 3600 multiplexers shown connected to respective representative terminals 12, 13. The nodes A and B are connected by a preferred T1 path 14 and an alternate T1 path 15. Both paths pass through the network "cloud" 16.

When a fault occurs on the preferred path T1, the T1 card at node A automatically enters an alarm state in a known manner, and redirects the traffic formerly carried over path 14 over alternate path 15.

When a loopback 18 is placed in path 14, as shown in FIG. 2, this causes the alarm condition in the T1 card at node A to clear. This card sees incoming data as if the trunk were operating normally, causing the T1 card to send data out over the faulty path 14. This results in the loss of data.

The invention determines the presence of a loopback on the path T1 and ensures that the alarm condition is not cleared in the T1 card at node A while the loopback is present.

In accordance with the invention, a known unique data pattern is continually placed onto the link when it is taken out of service. The received data is monitored to determine if it matches the transmitted data pattern. If a match occurs persistently, then a loopback is deemed to have been placed on the link.

The unique pattern is a twenty bit pattern consisting of the following information:

major node number (10 bits) of the equipment. For example, each Newbridge Networks 3600 Mainstreet™ multiplexer is assigned a unique node number in a T1 network. The major node number is analogous to a unique address.

slot in shelf. (6 bits) This is the physical slot in the card rack where the T1 interface card sits.

T1 link number. (4 bits) Each T1 interface card can terminate multiple T1 trunks. This identifies which T1.

The 16 bit pattern has the following format:

| Channel | T1 Channel Bits | Pattern Description | Pattern Bits |
|---------|-----------------|---------------------|--------------|
| TS23    | 6,5,4,3         | Major Node Number   | 9,8,7,6      |
| TS22    | 6,5,4,3         | Major Node Number   | 5,4,3,2      |
| TS21    | 6,5             | Major Node Number   | 1,0          |
| TS221   | 4,3             | Slot in Shelf       | 5,4          |
| TS20    | 6,5,4,3         | Slot in Shelf       | 3,2,1,0      |
| TS19    | 6,5,4,3         | T1 Link Number      | 3,2,1,0      |

The unique pattern can be carried across networks using RBS or JB7 signaling and not get corrupted.

Figure 3:
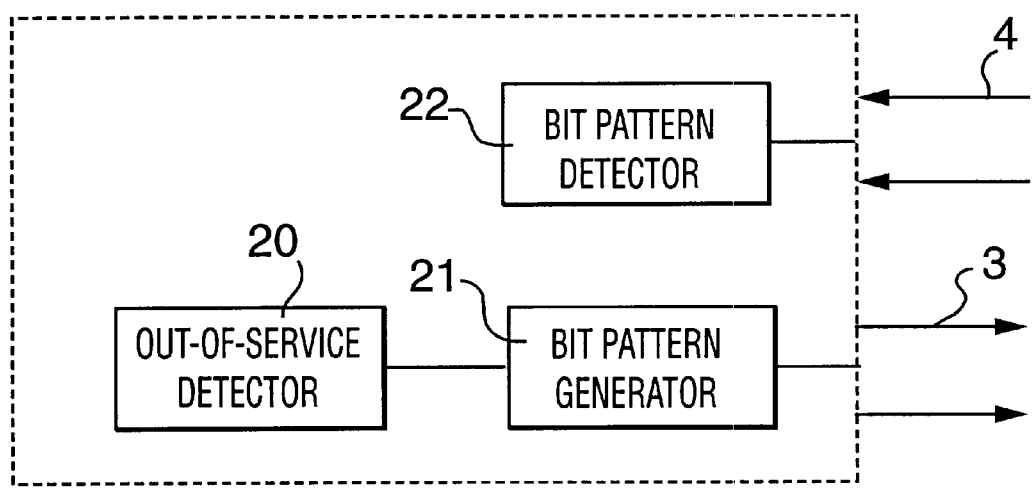
FIG. 3 shows a T1 card operating in accordance with the invention.

As shown in FIG. 3, a T1 card in accordance with the invention has an out-of-service detector 20 that detects an out-of-service condition on one of the trunks. This causes bit pattern generator to transmit the above bit pattern on a channel that is normally used for user data on the outgoing pair 3. Bit pattern detector 22 detects the presence of this bit pattern. If it persists, the presence of a loopback on the trunk is identified.

The loopback must be detected before the fault clears. To this end the loopback is detected within one second. Once detected the loopback alarm will be cleared 10 seconds after loopback removal.

The main advantages of this implementation is that it allows loopback detection on a T1, E1 or other primary rate Link that uses all 24 channels to carry user data/voice. On T1 trunks, generally channels 18 to 23 are used for loopback signaling, whereas on E1 trunks, generally channels 21 to 31 are employed for this purpose.

In addition, invention offers an inexpensive means of detecting loopbacks, and does not require proprietary in-band signaling techniques to implement.

The invention is thus useful for customers who are using protected connections in their network and do not have a timeslot dedicated to signaling. Undesired switch-backs to the preferred route are avoided while loopbacks are present.

We claim:

1. A method of detecting loopbacks on trunks in digital networks, comprising the steps of:

detecting an out-of-service trunk;

in response to the detection of an out-of-service trunk, initiating the continual placing of a predetermined bit pattern on at least one outgoing user channel on said out-of-service trunk at a network node while said trunk remains out-of-service;

continually monitoring at least one receive user channel on said trunk at said network node corresponding to said at least one outgoing channel to detect said bit pattern; and identifying the presence of a loopback when said bit pattern is persistently detected on said receive channel while said trunk is out of service.

2. A method as claimed in claim 1, wherein the bit pattern identifies the address of the equipment containing a trunk card for the out-of-service trunk.

3. A method as claimed in claim 2, wherein the bit pattern further identifies the physical slot in a card rack where the trunk card is located.

4. A method as claimed in claim 2, wherein the bit pattern further identifies particular outbound faulty trunk emanating from the trunk card.

5. A method as claimed in claim 1, wherein the trunk card is a T1 card.

6. A method as claimed in claim 1, wherein the trunk card is an E1 card.

7. An apparatus for detecting loopbacks on trunks in digital networks, comprising a detector for detecting an out-of-service trunk, means for initiating the continual placement of a predetermined bit pattern on an outgoing user channel in response to the detection of an out-of-service trunk at a network node by said detector while said trunk remains out of service, means for continually monitoring a receive user channel of said trunk at said network node to detect said bit pattern while said trunk is out of service, and means for identifying the presence of a loopback when said bit pattern is persistently detected on said receive user channel.

* * * * *